United States Patent
Pai et al.

(10) Patent No.: US 10,944,571 B2
(45) Date of Patent: Mar. 9, 2021

(54) DEVICE RE-ACTIVATION

(71) Applicant: Apple Inc., Cupertino, CA (US)

(72) Inventors: Raghunandan K. Pai, Cupertino, CA (US); Thomas P. Mensch, Sunnyvale, CA (US); Navin Bindiganavile Suparna, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 303 days.

(21) Appl. No.: 15/721,538

(22) Filed: Sep. 29, 2017

(65) Prior Publication Data

US 2018/0351748 A1 Dec. 6, 2018

Related U.S. Application Data

(60) Provisional application No. 62/514,868, filed on Jun. 4, 2017.

(51) Int. Cl.

| | |
|---|---|
| *H04L 9/32* | (2006.01) |
| *H04L 9/08* | (2006.01) |
| *H04L 9/14* | (2006.01) |
| *G06F 11/14* | (2006.01) |
| *H04L 9/30* | (2006.01) |

(52) U.S. Cl.
CPC ........ *H04L 9/3247* (2013.01); *G06F 11/1469* (2013.01); *H04L 9/0861* (2013.01); *H04L 9/0894* (2013.01); *H04L 9/14* (2013.01); *H04L 9/30* (2013.01); *H04L 9/321* (2013.01); *H04L 9/3226* (2013.01); *G06F 2201/835* (2013.01); *H04L 2209/80* (2013.01)

(58) Field of Classification Search
CPC ...... H04L 9/0894; H04L 9/321; H04L 9/3226
USPC ........................................................ 713/176
See application file for complete search history.

(56) References Cited

U.S. PATENT DOCUMENTS

| | | | | |
|---|---|---|---|---|
| 6,934,393 | B2 * | 8/2005 | Aull ....................... | G06F 21/33 380/277 |
| 8,918,853 | B2 * | 12/2014 | Thomas ................ | G06F 21/335 726/9 |
| 2006/0242415 | A1 * | 10/2006 | Gaylor ................... | G06F 21/31 713/176 |
| 2008/0016178 | A1 * | 1/2008 | Portugali ............ | G06F 11/1464 709/217 |
| 2008/0232598 | A1 * | 9/2008 | Vennelakanti ........ | G06F 21/602 380/279 |

(Continued)

*Primary Examiner* — Teshome Hailu
(74) *Attorney, Agent, or Firm* — Morgan, Lewis & Bockius LLP

(57) ABSTRACT

Some embodiments provide a method for recovering user data for a device. To initiate recovery, the method sends to a first server a first request including at least (i) a device identifier and (ii) a first set of cryptographic data for a second set of servers with which the first server communicates. If the first server verifies the device identifier with an attestation authority, the method receives from the second set of servers a second set of cryptographic data generated by the second set of servers. After receiving input of a device passcode for the device, the method sends to the first server a second request comprising at least a third set of cryptographic data for the second set of servers generated based on the device passcode. If the first server verifies the device passcode with the second set of servers, the method receives access to the user data.

21 Claims, 9 Drawing Sheets

(56) References Cited

U.S. PATENT DOCUMENTS

| | | | | |
|---|---|---|---|---|
| 2010/0100721 | A1* | 4/2010 | Su | G06F 11/1456 |
| | | | | 713/150 |
| 2010/0142713 | A1* | 6/2010 | Perlman | H04L 9/0869 |
| | | | | 380/286 |
| 2011/0202768 | A1* | 8/2011 | Choi | G06F 21/41 |
| | | | | 713/168 |
| 2012/0023589 | A1* | 1/2012 | Walrath | H04W 12/12 |
| | | | | 726/26 |
| 2013/0061058 | A1* | 3/2013 | Boivie | G06F 21/74 |
| | | | | 713/189 |
| 2016/0092671 | A1* | 3/2016 | Andreeva | G06F 21/41 |
| | | | | 726/6 |

\* cited by examiner

DEVICE RE-ACTIVATION

BACKGROUND

When a user loses a mobile device (or has the device stolen), certain device registration systems allow the user to report that the device is lost/stolen, and automatically erase all of their user data from that device. To prevent a possible thief from gaining the ability to use such a device, the device registration system requires that a user enter their system username and password for an account with which the device is associated in order to unlock the device and be provided with the option to recover their data. However, users will often not remember their username and/or password, making recovery more difficult.

BRIEF SUMMARY

Some embodiments provide a method for enabling a user to recover user data for a device that has been reported as lost or stolen using a previous passcode for the device. The method of some embodiments verifies that the data recovery request is sent from the actual device, as opposed to a different device that is maliciously posing as the device for which data recovery is sought, by requiring the device to use securely stored hardware-specific data within the request process.

In some embodiments, the device is registered with a device registration service (e.g., operated by the manufacturer of the device and/or operating system of the device) that also securely stores user data for the device (and possibly for other devices linked to the same account). The device registration service of some embodiments includes one or more device activation servers that handle requests from devices to set up a user account (either a new account or an existing account with stored user data) on a device. In addition, the device registration service of some embodiments includes an attestation authority for attesting to the origin of certain data (e.g., a public key) as being a specific device (based on a separate long-term key that is securely installed on the device by the manufacturer) and a set of data recovery servers. These data recovery servers of some embodiments securely store the user data, protected by a recovery key (or set of keys) stored on highly secure hardware security modules (HSMs).

In some embodiments, when a user initially registers the device with the device registration service (i.e., by logging into an account on the device), the device becomes "activation locked". An activation locked device cannot be re-activated (for either the current user account or a new user account) without releasing the activation lock. Anytime a user attempts to re-register the device, the user is prompted for proof that they are the initial user of the device (or have the permission of that user), thereby preventing someone else from gaining use of the device. As an example of use, when the device is lost or stolen, the user can (e.g., via another of her devices, via a web browser sign-in, etc.) report the device as missing, and remotely erase all of the user data from the device. When the initial user recovers the device and wants to activate the device (or a new user tries to activate the device), the device only has an open communication channel to the device activation servers, and thus cannot directly communicate with the attestation authority or the data recovery servers.

Thus, to recover user data for the device, some embodiments allow the device to communicate with the data recovery servers via the device activation servers, while using the attestation authority as additional verification of the device identity. The device activation servers communicate with the device as a proxy for the data recovery servers and the attestation authority, in some embodiments. Specifically, the device sends to the device activation servers (i) device activation requests, (ii) cryptographic transactions for the data recovery servers to verify the device and set up a secure channel for data recovery, and (iii) proof of device identity for the attestation authority so that the attestation authority can issue a certificate attesting to the device identity. In addition, the device activation servers send to the device (i) the device activation responses and (ii) cryptographic transactions from the data recovery servers. In some embodiments, the cryptographic transactions and proof of device identity requests are piggybacked on the device activation requests and responses.

In some embodiments, the device activation process is performed in two sets of request/responses between the device and the device activation servers. In the first request, the device (after being booted up, connected to a network, etc.) sends an initial request to the activation server for its activation status. In addition, piggybacked on this request is a first set of cryptographic data for setting up a secure communication channel with the data recovery servers. This first set of data for the data recovery servers, in some embodiments, includes a random nonce generated by the device (e.g., the first set of cryptographic data exchanged in a password-authenticated key exchange (PAKE)) and an indicator as to the device that is requesting the data.

The first request also includes an attestation request for the attestation authority. As mentioned, the device includes secure memory that stores a long-term device-specific key as well as a device identifier. This long-term device-specific key is used to generate the request for the attestation authority, which includes a public key of a public/private key pair randomly generated by the device for the transaction, as well as the device identifier stored by the attestation authority and device activation server. The device uses the private key of the key pair to generate a signature of the device identifier and the cryptographic data for the data recovery servers (i.e., the nonce), which is included with the request.

Once the device activation server receives this first request, some embodiments first verify the device identity. The device activation server sends the attestation request to the attestation authority, which verifies that the request was sent from the device (i.e., based on the use of the long-term device-specific key). The attestation authority issues a certificate certifying the public key of the randomly-generated key pair, and returns this certificate to the device activation server.

At this point, the device activation server can verify the other data sent from the device. Specifically, the activation server uses the public key attested to by the certificate to verify the signature from the device (i.e., the signature of the nonce and the device identifier). The device activation server also compares the device identifier in the certificate to the signed device identifier (and, in some embodiments, compares a separate device identifier in the certificate, such as an IMEI ID, with a stored identifier for the device). Assuming the signature and device identifier are verified, the device activation server forwards the cryptographic data to the data recovery servers.

The data recovery server treats the data recovery request with the cryptographic data as a standard request, and generates its own set of data to return to the device. This set of data generated by the data recovery server includes a new random nonce, in some embodiments (e.g., the second set of cryptographic data exchanged in a PAKE). Because the data recovery servers are in direct communication with the activation server rather than the device, this second set of cryptographic data is returned to the activation server. The activation server sends its response to the first request back to the device along with the second set of cryptographic data from the data recovery server. When the device is activation locked, the activation server response includes this status information, as well as the data from the recovery server.

In some embodiments, the device then provides the user with an activation lock user interface (UI). In some embodiments, this UI provides the user with the opportunity to enter the username and password of an account maintained by the device registration service (e.g., a cloud services account) with which the device is associated. In some embodiments, if the user enters the account username and password, then the device attestation process is not required for subsequent requests (though some embodiments will require 2-factor authentication, using a second device associated with the account).

However, users will often not be able to remember their username and/or password, so some embodiments provide an option for the user to enter the most recent device passcode for the device. Some embodiments limit this to the most recent device passcode, while other embodiments allow a user to enter any previous passcode for the device. This device passcode, in some embodiments, is the passcode used to unlock the device before the device was activation locked, and is also the passcode used to recover the user data protected by the data recovery servers.

When the user opts to enter the device passcode, the second request to the activation server includes (i) a third set of cryptographic data for the data recovery servers and (ii) a second attestation request. In this case, the third set of cryptographic data is generated based on the device passcode. Having exchanged the nonces (which are in effect public keys), the device and the data recovery servers have set up a secure channel via which the passcode is sent. The device performs a mathematical operation on the passcode and combines this with at least the nonce from the server to generate the third set of cryptographic data.

In addition, the device generates a new attestation request, by generating a new ephemeral public/private key pair, and generates a signature of the same device identifier and the third set of cryptographic data using the private key of this key pair. The attestation request, signature, device identifier, and third set of cryptographic data are then sent to the device activation server.

The device activation server again sends the attestation request to the attestation authority and, assuming a certificate is returned, performs the same verifications before forwarding the cryptographic data to the data recovery server. Assuming that the device identifier in the certificate matches the device identifier signed with the one-time key, the activation server sends the cryptographic data to the data recovery servers.

If the user has entered the passcode correctly, this is verified by the data recovery servers, which provide access to the user data. In some embodiments, the data recovery servers only store a device-specific recovery key, which is provided to the device via the secure channel set up with the PAKE. The device can then use this recovery key to access the backed-up user data, possibly via one or more layers of indirection (e.g., using the device-specific key to access a master recovery key, which in turn allows for access to the user data).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description further describe the embodiments described in the Summary as well as other embodiments. Accordingly, to understand all the embodiments described by this document, a full review of the Summary, the Detailed Description, and the Drawings is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
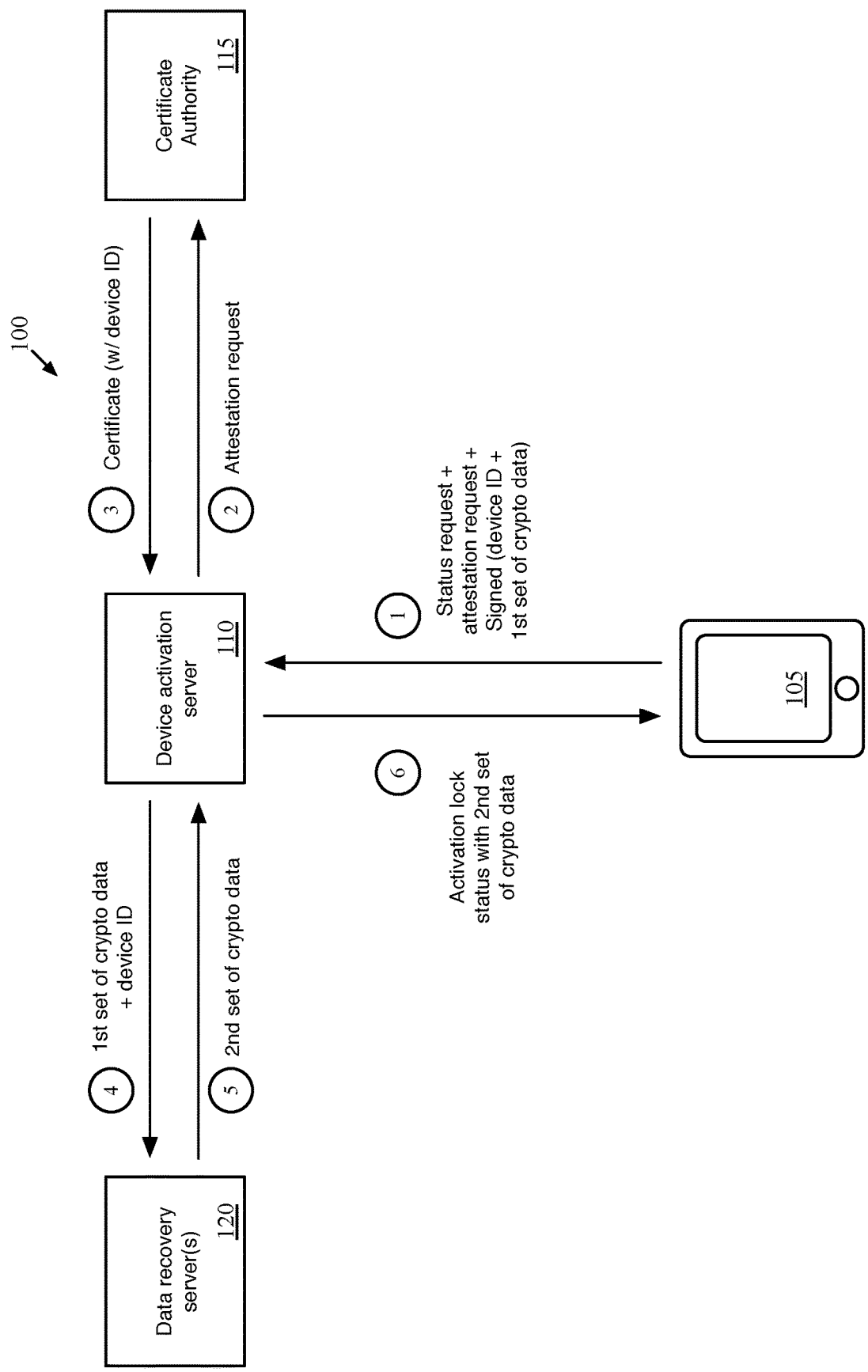
FIG. 1 conceptually illustrates a system of some embodiments, with a first request and response between a device and a device activation server.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for enabling a user to recover user data for a device that has been reported as lost or stolen using a previous passcode for the device. The method of some embodiments verifies that the data recovery request is sent from the actual device, as opposed to a different device that is maliciously posing as the device for which data recovery is sought, by requiring the device to use securely stored hardware-specific data within the request process.

In some embodiments, the device is registered with a device registration service (e.g., operated by the manufacturer of the device and/or operating system of the device) that also securely stores user data for the device (and possibly for other devices linked to the same account). The device registration service of some embodiments includes one or more device activation servers that handle requests from devices to set up a user account (either a new account or an existing account with stored user data) on a device. In addition, the device registration service of some embodiments includes an attestation authority for attesting to the origin of certain data (e.g., a public key) as being a specific device (based on a separate long-term key that is securely installed on the device by the manufacturer) and a set of data recovery servers. These data recovery servers of some embodiments securely store the user data, protected by a recovery key (or set of keys) stored on highly secure hardware security modules (HSMs).

In some embodiments, when a user initially registers the device with the device registration service (i.e., by logging into an account on the device), the device becomes "activation locked". An activation locked device cannot be re-activated (for either the current user account or a new user account) without releasing the activation lock. Anytime a user attempts to re-register the device, the user is prompted for proof that they are the initial user of the device (or have the permission of that user), thereby preventing someone else from gaining use of the device. As an example of use, when the device is lost or stolen, the user can (e.g., via another of her devices, via a web browser sign-in, etc.) report the device as missing, and remotely erase all of the user data from the device. When the initial user recovers the device and wants to activate the device (or a new user tries to activate the device), the device only has an open communication channel to the device activation servers, and thus cannot directly communicate with the attestation authority or the data recovery servers.

Thus, to recover user data for the device, some embodiments allow the device to communicate with the data recovery servers via the device activation servers, while using the attestation authority as additional verification of the device identity. The device activation servers communicate with the device as a proxy for the data recovery servers and the attestation authority, in some embodiments. Specifically, the device sends to the device activation servers (i) device activation requests, (ii) cryptographic transactions for the data recovery servers to verify the device and set up a secure channel for data recovery, and (iii) proof of device identity for the attestation authority so that the attestation authority can issue a certificate attesting to the device identity. In addition, the device activation servers send to the device (i) the device activation responses and (ii) cryptographic transactions from the data recovery servers. In some embodiments, the cryptographic transactions and proof of device identity requests are piggybacked on the device activation requests and responses.

FIG. 1 conceptually illustrates such a system 100 of some embodiments, with a first request and response between a device 105 and a device activation server 110. As shown, the system 100 includes a device 105, a device activation server 110, a certificate authority 115, and a data recovery server (or set of servers) 120. The device 105 may be a smart phone, tablet, smart watch, other mobile device, laptop or desktop computer, etc., in different embodiments. In this case, the device 105 was previously registered to a particular user (i.e., with a particular cloud services account or other device registration service account), and a user (either the original user or a new user) is attempting to re-activate the device (e.g., after the device was reported as missing). In some embodiments, the device registration service prevents the device from being activated in this situation unless adequate proof that the original user has recovered the device is provided.

The device activation server 110, certificate authority 115, and data recovery servers 120 are all managed by the same entity (i.e., the manager of the device registration service), which may be the manufacturer/developer of the device and/or device operating system in some embodiments. This entity has access to device-specific (i.e., hardware-specific) information in some embodiments, that is securely stored on the device 105 and remains on the device even when all of the user data is wiped from the device.

The device activation server 110 is shown as a single server with which the device communicates, but may be a server cluster in some embodiments. In addition, for a process with multiple requests to and from the server, in some embodiments the device 105 communicates with different servers for different requests. When the device 105 is initially booted up and has not yet been associated with a device registration service account, in some embodiments the device can only communicate with the device activation server 110 (i.e., the device does not yet have the ability to directly contact the data recovery servers 120 or the attestation authority 115). The device activation server 110 handles activation requests from the device 105, stores the activation status of the device, and acts as a proxy for the data recovery servers 120 and certificate authority 115 for communication with the device 105.

The certificate authority 115 (also referred to as an attestation authority) attests to the origin of a public key or other data (i.e., that the public key came from a particular device, operating system, etc.). This attestation is based on the use of a hardware-specific long-term key in the generation of the attestation request by the device, in some embodiments.

The data recovery servers 120 of some embodiments securely store user data, or at least the ability to access securely stored user data. In some embodiments, the data recovery servers 120 securely store a key or set of keys that enables the user to access user data backed up on a different set of servers managed by the same service. These data recovery servers are highly secure hardware security modules (HSMs) in some embodiments, with which a user can escrow a device-specific recovery key. In some embodiments, the device-specific recovery key is used to access a master recovery key, which in turn accesses the user data. The user data backup system of some embodiments is described in greater detail in U.S. Patent Publication 2016/0352518 and U.S. Pat. No. 9,106,411, which are incorporated herein by reference.

In some embodiments, the removal of activation lock status and access to backed up user data (or at least the key that enables access to user data) is performed via two requests sent from the device 105 to the activation server 110 and subsequent responses from the activation server 110 to the device 105. FIG. 1 illustrates the first of these request/responses, and will be described in part by reference to FIGS. 2 and 3, which illustrate the processes performed by the device 105 and the device activation server 110 for this request and response.

As shown by the encircled 1 in FIG. 1, the device 105 initially sends an activation status request to the device activation server 110. Piggybacked onto this status request is an attestation request, a device identifier, and a first set of cryptographic data. In addition, the device identifier and first set of cryptographic data are signed with a private key of a public/private key pair. The attestation request requests that the certificate authority 115 attest to the public key of this key pair.

Figure 2:
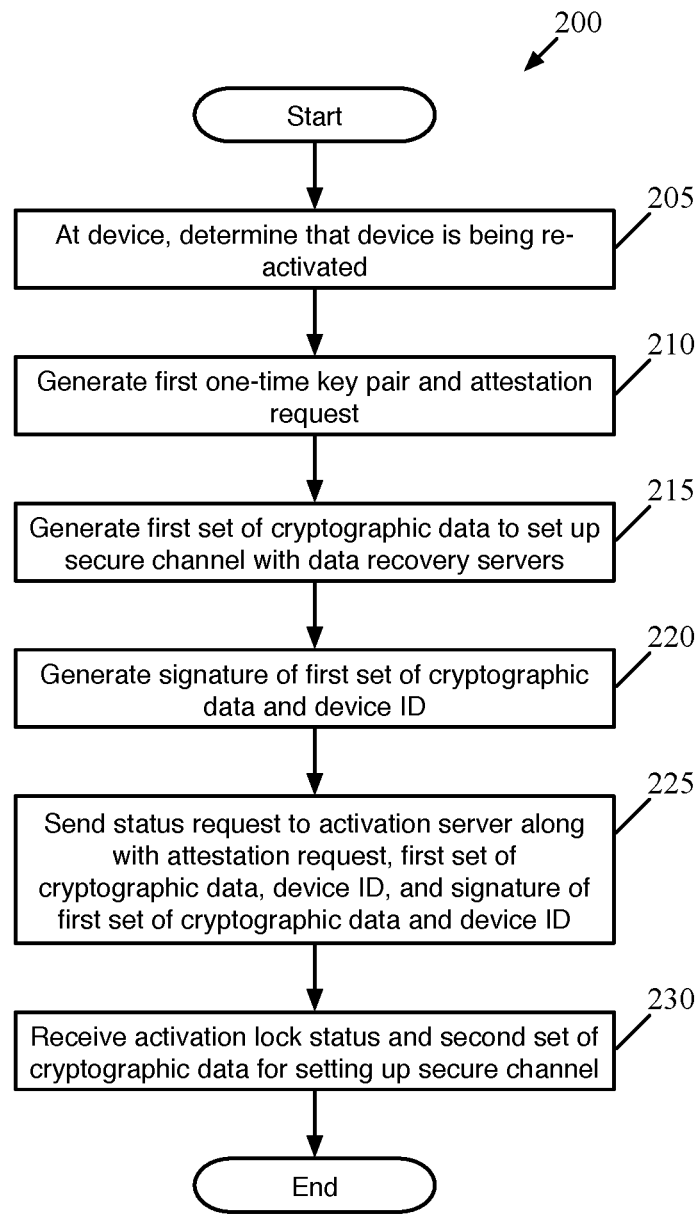
FIG. 2 conceptually illustrates a process of some embodiments performed by a device to generate an activation status request.

FIG. 2 conceptually illustrates a process 200 of some embodiments performed by a device to generate an activation status request. In some embodiments, this process 200 is performed by a device 105 when the device is initially booted up for activation, irrespective of whether the device has been activation locked. In some embodiments, the device activation server(s) 110 store the activation status of the device 105. As such, the device 105 performs the process 200 (or a similar process) when the device is booted up for activation for the first time (i.e., as a new device), after the device has been wiped, etc.

As shown, the process 200 begins by determining (at 205) that the device (i.e., the device that performs this process) is being activated. In some embodiments, when a user turns on a device for the first time, various procedures are followed to, e.g., select a language and region, connect the device to a network, etc. At this point, the device 105 has the information and ability to contact the activation servers 105 (e.g., via a network address pre-installed in the device operating system), but not the data recovery servers 120 or attestation authority 115. The device 105 begins generating the activation status request and accompanying data to begin the activation process.

The process 200 generates (at 210) a first one-time key pair and an attestation request. The one-time key pair, in some embodiments, is a randomly-generated public/private key pair used specifically for the activation status request. As also noted, the device 105 includes secure memory that stores a long-term device-specific key as well as a device identifier. This long-term device-specific key is used to generate the attestation request, which includes the public key of the one-time key pair, as well as the device identifier. This device identifier is stored in the secure memory of the device 105, and is also stored by the attestation authority and/or device activation server.

The process 200 also generates (at 215) a first set of cryptographic data for setting up a secure channel with the data recovery servers. This first set of cryptographic data for the data recovery servers, in some embodiments, includes a random nonce generated by the device (e.g., the first set of cryptographic data exchanged in a password-authenticated key exchange (PAKE)). Some embodiments, specifically, use the Secure Remote Password (SRP) protocol to set up a secure encrypted channel between the device 105 and the data recovery servers 120. Once this channel is setup, data sent between the device 105 and the data recovery servers 120 (e.g., the recovery key for the device) cannot be accessed by intermediaries, including the device activation server 110.

Next, the process 200 generates (at 220) a signature of the first set of cryptographic data and the device identifier. In some embodiments, the device uses the private key of the recently-generated one-time key pair to generate this signature. The signature allows the device activation server to authenticate that the source of the data that it is sending to the data recovery server 120 is, in fact, the device 105, as attested to by the attestation authority 115.

With the attestation request and signature generated, the process 200 sends (at 225) the status request to the activation server, along with the attestation request, the first set of cryptographic data, the device identifier, and the generated signature (of the first set of cryptographic data and device identifier). As noted, this is the request indicated by the encircled 1 in FIG. 1.

After the device activation server 110 performs its transactions with the certificate authority 115 and the data recovery servers 120, the process 200 receives (at 230) a status indication that the device is activation locked (this assumes that the device is, in fact, activation locked) along with a second set of cryptographic data for setting up the secure channel between the device 105 and the data recovery servers 120. The generation of this response from the device activation server 110 and its interaction with the attestation authority 115 and the data recovery servers 120 will be described further below.

Figure 3:
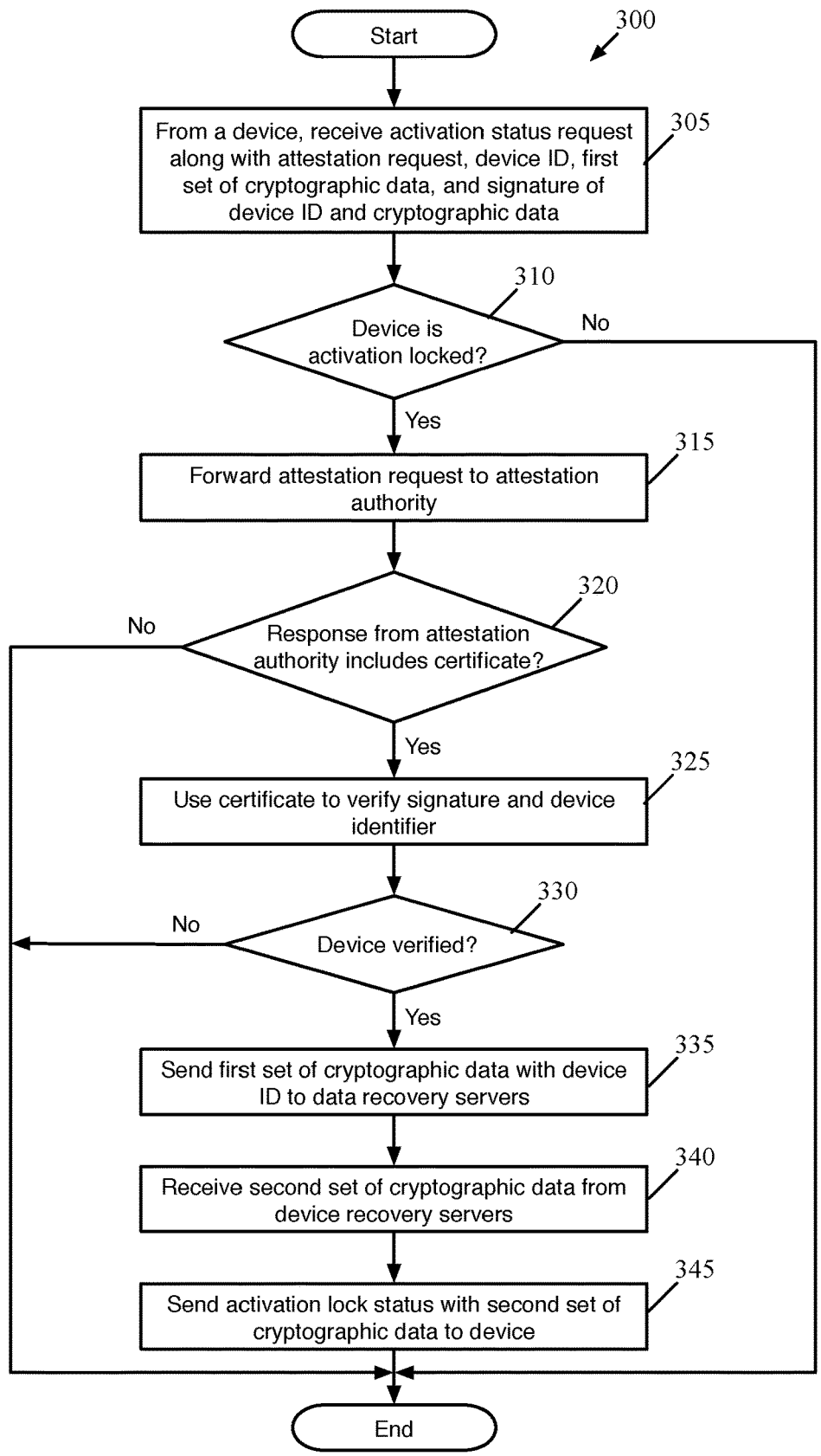
FIG. 3 conceptually illustrates a process of some embodiments performed by a device activation server or servers in response to a request from an initial activation status request from a device.

FIG. 3 conceptually illustrates a process 300 of some embodiments performed by a device activation server or servers in response to a request from an initial activation status request from a device. In some embodiments, the activation server performs some aspects of the process irrespective of whether the device is activation locked or not, but the majority of this process refers specifically to the case of a request from an activation locked device.

As shown, the process 300 begins by receiving (at 305), from a device, an activation status request along with an attestation request, a device identifier, a first set of cryptographic data, and a signature of the device identifier and cryptographic data. This is the request shown by the encircled 1 in FIG. 1.

Based on the activation status request, the process 300 determines (at 310) whether the device is activation locked. If the device 105 is a brand-new device, then the device will not be activation locked. Similarly, if the device 105 is a refurbished device, or has been wiped and handed off to, e.g., a friend or family member, then the device should have been fully disassociated from its previous account and will not be activation locked. However, if the previous user of the device has not disassociated the device from the previous account (e.g., because the device was reported as missing), then the device activation server 110 will identify the device 105 as activation locked, and therefore that the device can only be re-associated with the previous account (and not with a different account). If the device activation server 100 determines that the device 105 is not activation locked, the process 300 ends (although the device activation server 110 would perform a different set of processes to activate the device 105).

On the other hand, if the device is activation locked, some embodiments first verify the device identity. The process 300 forwards (at 315) the attestation request to the attestation authority, which verifies that the request was sent from the device (i.e., based on the use of the long-term device-specific key). The attestation authority issues a certificate certifying the public key of the randomly-generated key pair, and returns this certificate to the device activation server.

FIG. 1 illustrates, via the encircled 2, the device activation server 110 forwarding the attestation request generated by the device 105 to the attestation authority 115. The attestation authority 115, as mentioned, verifies that the origin of the request is in fact the device 105, and returns a certificate (e.g., an X509 certificate) to the device activation server 110, as shown by the encircled 3. The certificate attests to the origin of the public key that was sent as part of the attestation request, and includes the device identifier for the device 105, verifying that this device identifier corresponds to the device that generated the request and public key.

The process 300 determines (at 320) whether the response from the attestation authority includes a certificate. If the attestation authority cannot attest to the validity of the attestation request, it may return an error or other indication. In this case, the process 300 ends. In some embodiments, the device activation server 110 sends an error message to the device 105, indicating that the device is activation locked and cannot be activated.

At this point, the device activation server 110 has the ability to verify the other data sent from the device 110. The process 300 uses (at 325) the certificate from the attestation authority to verify the signature and device identifier received from the device before forwarding this data to the data recovery servers. Specifically, the device activation server 110 uses the public key attested to by the certificate to verify the signature from the device (i.e., the signature of the cryptographic data and the device identifier, which was signed with the corresponding private key). The device activation server 110 also compares the device identifier in the certificate to the signed device identifier (and, in some embodiments, compares a separate device identifier in the certificate, such as an IMEI ID, with a stored identifier for the device).

The process determines (at 330) whether the device is verified, and if the device is not verified (i.e., the device fails any of the verification tests), the process ends. In some embodiments, the device activation server 110 sends an error message to the device 105, indicating that the device is activation locked and cannot be activated. Assuming, however, that the signature and device identifier are verified, the process sends (at 335) the first set of cryptographic data to the data recovery servers along with the now-verified device identifier. This operation is shown in FIG. 1 by the encircled 4.

The data recovery server 120 treats the data recovery request with the first set of cryptographic data as a standard request, and generates its own second set of cryptographic data to return to the device. This second set of cryptographic data generated by the data recovery server 120 includes a new random nonce, in some embodiments (e.g., the second public key exchanged in a PAKE such as SRP). Because the data recovery servers 120 are in direct communication with the device activation server 110 rather than the device 105, this second set of cryptographic data is returned to the device activation server 110, as shown by the encircled 5. The process thus receives (at 340) the second set of cryptographic data from the device recovery servers.

Lastly, the process 300 sends (at 345) the activation lock status (its own response) to the device along with the second set of cryptographic data from the data recovery servers. FIG. 1 illustrates this response with the encircled 6. As the device 105 is activation locked, the response from the device activation server 110 indicates this status so that the device enters activation lock mode.

Figure 4:
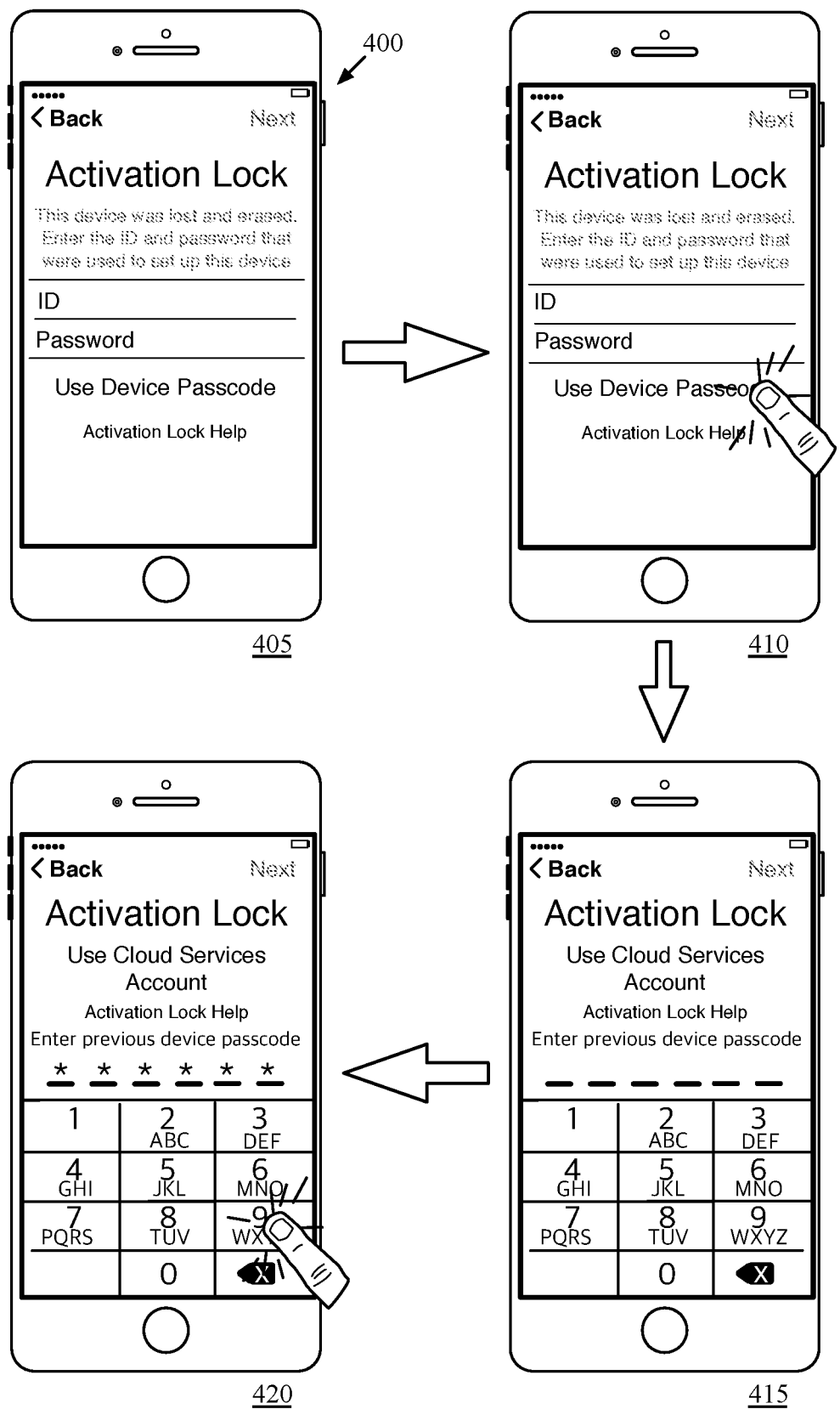
FIG. 4 conceptually illustrates the activation lock UI over four stages as a user enters a previous device passcode.

In some embodiments, upon receiving the status response from the device activation server 110, the device 105 enters activation lock mode, and provides the user with an activation lock user interface (UI). FIG. 4 conceptually illustrates this activation lock UI 400 over four stages 405-420 as a user enters a previous device passcode.

As shown at the first stage 405, the activation lock UI 400 of some embodiments initially provides the user with the opportunity to enter the username and password of an account maintained by the device registration service (e.g., a cloud services account) with which the device was previously associated. In some embodiments, if the user enters the account username and password, then the device attestation process is not required for subsequent requests. However, some embodiments do require 2-factor authentication, using a second device associated with the account to verify that the user is the owner of the account.

However, users will often not be able to remember their username and/or password, so some embodiments provide an option for the user to enter the most recent device passcode for the device. Some embodiments limit this to the most recent device passcode, while other embodiments allow a user to enter any previous passcode for the device. As shown in the second stage 410, the user selects a selectable item 425 that provides the option to use the device passcode. In the third stage 415, the activation lock UI 400 no longer provides fillable fields for entering the username and password, and instead provides the user with the ability to enter a six-digit previous device passcode. This device passcode, in some embodiments, is the passcode that was most recently used to unlock the device before the device was activation locked, and is also the passcode used to recover the user data protected by the data recovery servers.

In the fourth stage 420, the user enters this previous device passcode, thereby starting the second request and response process. It should be understood that the UI shown in FIG. 4 is one embodiments, and that other embodiments may present the option to enter the device passcode differently. For example, some embodiments display a typical locked-screen UI for entering the device passcode.

Figure 5:
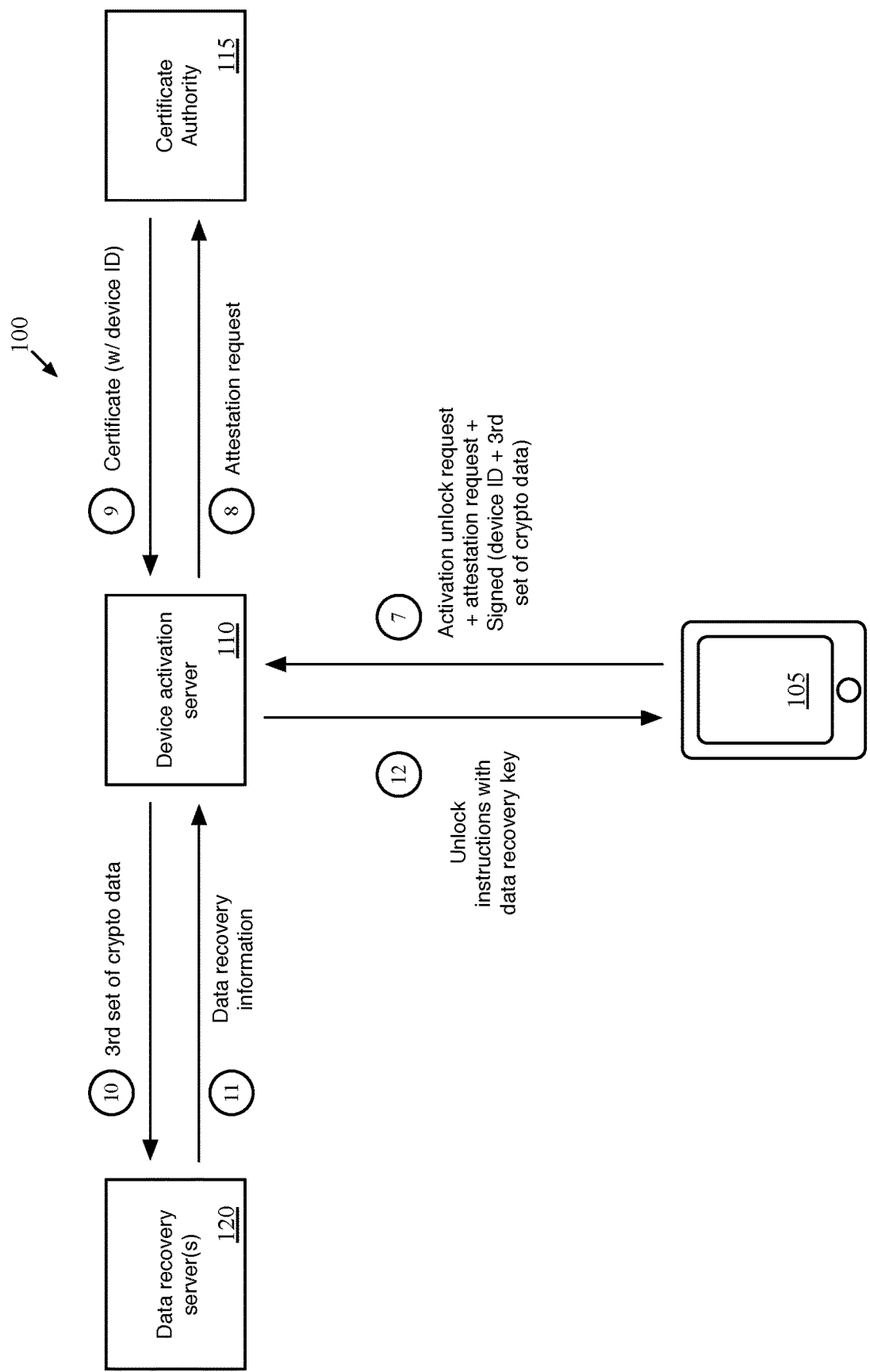
FIG. 5 conceptually illustrates the system of some embodiments, showing the second request and response between the device and the device activation server after a user enters the previous device passcode on the device.

FIG. 5 conceptually illustrates the system 100 of some embodiments, showing the second request and response between the device 105 and the device activation server 110 after a user enters the previous device passcode on the device 105. As shown by the encircled 7, when the user opts to enter the device passcode, the second request to the activation server includes (i) an activation unlock request, (ii) a third set of cryptographic data for the data recovery servers and (iii) a second attestation request for a second one-time public key. In addition, the third set of cryptographic data and the device identifier are signed with the corresponding one-time private key, as in the first request.

Figure 6:
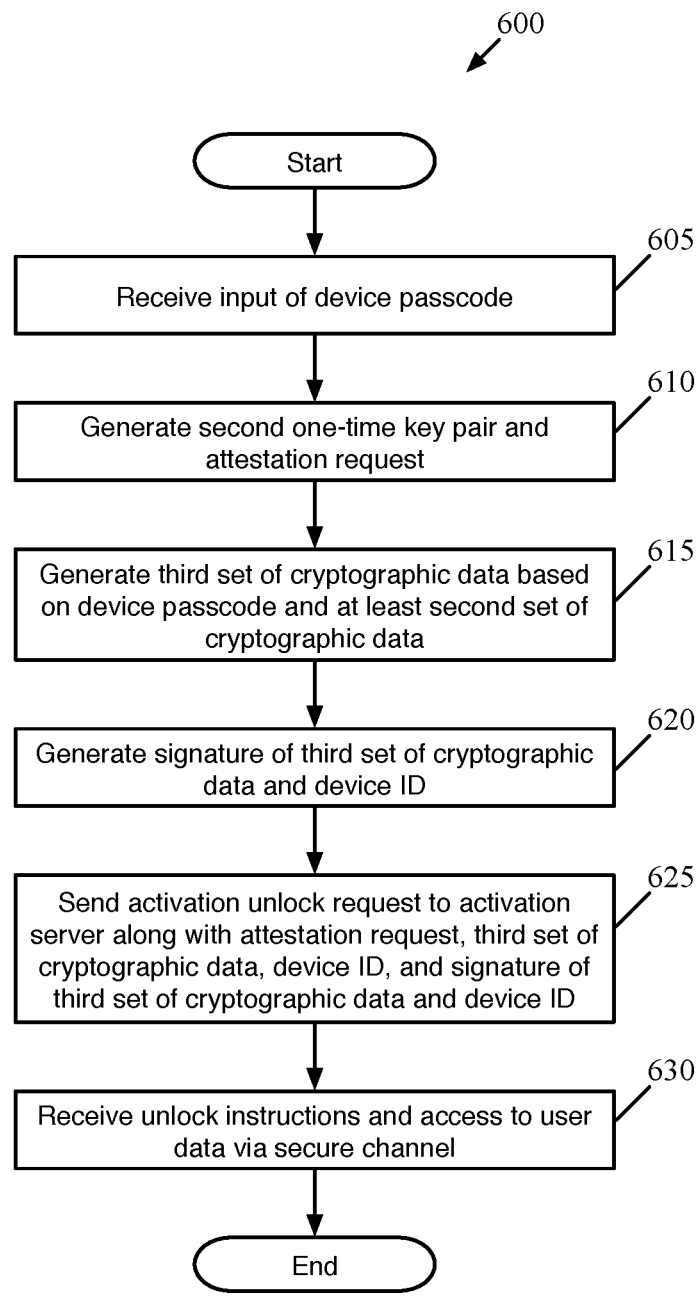
FIG. 6 conceptually illustrates a process of some embodiments performed by a device to generate an activation unlock request.

FIG. 6 conceptually illustrates a process 600 of some embodiments performed by a device to generate this activation unlock request. In some embodiments, the process 600 is performed by an activation locked device 105 when the user chooses to use the previous device passcode to unlock the device. As shown, the process 600 begins by receiving (at 605) input of a device passcode (e.g., through a UI such as that shown in FIG. 4.

The process 600 then generates (at 610) a second one-time key pair and a second attestation request. This one-time key pair, in some embodiments, is a randomly-generated public/private key pair used specifically for the activation unlock request. The key pair is generated in the same manner in some embodiments as the first key pair generated for the initial activation status request. As noted, the device 105 includes secure memory that stores a long-term device-specific key as well as a device identifier. This long-term device-specific key is used to generate the attestation request, which includes the public key of the new one-time key pair, as well as the device identifier. This device identifier is stored in the secure memory of the device 105, and is also stored by the attestation authority and/or device activation server.

The process 600 also generates (at 615) a third set of cryptographic data based on at least the device passcode and the second set of cryptographic data received from the data recovery servers. Having exchanged nonces (which are in effect public keys) with the data recovery servers 120, the device 105 and the data recovery servers 120 have set up a secure channel via which the device passcode is proved. The device performs a mathematical operation on the passcode and combines this with at least the nonce from the data recovery servers 120 to generate the third set of cryptographic data. In some embodiments, the nonce received from the data recovery servers 120 is combined with data from which the first set of cryptographic data is generated (via a one-way function) to generate a session key, which is used to encrypt the device passcode for transmission. Other embodiments may use other techniques to generate the third set of cryptographic data based on the device passcode.

Next, the process 600 generates (at 620) a signature of the third set of cryptographic data and the device identifier. In some embodiments, the device uses the private key of the recently-generated (second) one-time key pair to generate this signature. The signature allows the device activation server 110 to authenticate that the source of the data that it is sending to the data recovery server 120 is, in fact, the device 105, as attested to by the attestation authority 115.

With the attestation request and signature generated, the process 600 sends (at 625) the activation unlock request to the activation server, along with the attestation request, the third set of cryptographic data, the device identifier, and the generated signature (of the third set of cryptographic data and device identifier). As noted above, this is the request indicated by the encircled 7 in FIG. 5.

After the device activation server 110 again performs its transactions with the attestation authority 115 and the data recovery servers 120, the process 600 receives (at 630) unlock instructions indicating that the device can be activated (assuming that the passcode was entered correctly). The device also receives access to the user data via the secure channel. In some embodiments, the data recovery servers provide a key (in encrypted format) that allows the device to access the user data. The generation of this second response from the device activation server 110 and its interaction with the attestation authority 115 and the data recovery servers 120 will be described further below.

Figure 7:
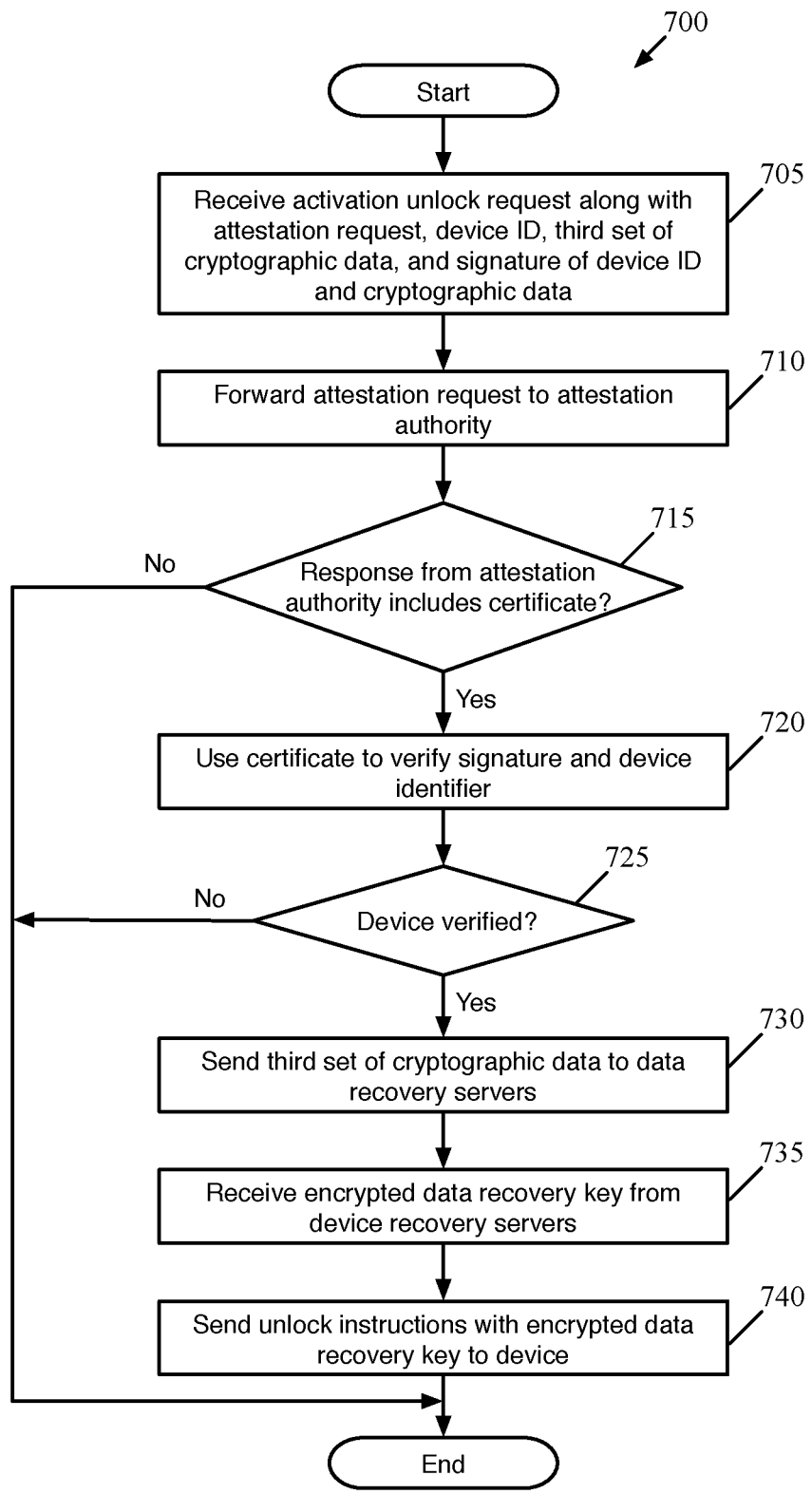
FIG. 7 conceptually illustrates a process of some embodiments performed by the device activation server or servers in response to an activation unlock request from a device that uses the previous device passcode.

FIG. 7 conceptually illustrates a process 700 of some embodiments performed by the device activation server or servers in response to an activation unlock request from a device that uses the previous device passcode. As noted, in some embodiments the user can instead enter the username and password of a cloud services or other account with which the device was registered in order to enable activation of the device, in which case the device activation server 110 performs a different process.

As shown, the process 700 begins by receiving (at 705) an activation unlock request along with an attestation request (the second attestation request), a device identifier, a third set of cryptographic data, and a signature of the device identifier and cryptographic data. This is the request shown by the encircled 7 in FIG. 5. Because this is the second request from the device 105, the device activation server 110 knows at this point that the device is activation locked, and only has to determine whether the user is using a username/password or device passcode in order to remove the activation lock. Some embodiments provide an indicator as part of the request that identifies the method used.

The process 700 then forwards (at 710) the attestation request to the attestation authority, which verifies that the request was sent from the device (i.e., based on the use of the long-term device-specific key). The attestation authority 115 again issues a certificate certifying the public key of the randomly-generated key pair, and returns this certificate to the device activation server. FIG. 5 illustrates, via the encircled 8, the device activation server 110 forwarding the attestation request generated by the device 105 to the attestation authority 115. The attestation authority 115, as mentioned, verifies that the origin of the request is in fact the device 105 (as for the first attestation request), and returns a certificate (e.g., an X509 certificate) to the device activation server 110, as shown by the encircled 9. Like the first certificate shown in FIG. 1, this certificate attests to the origin of the public key that was sent as part of the second attestation request, and includes the device identifier for the device 105, verifying that this device identifier corresponds to the device that generated the request and public key.

The process 700 then determines (at 715) whether the response from the attestation authority includes a certificate. If the attestation authority cannot attest to the validity of the attestation request, it may return an error or other indication. In this case, the process 300 ends. In some embodiments, the device activation server 110 sends an error message to the device 105, indicating that the device is activation locked and cannot be activated. In general, if the attestation authority issued a certificate for a first attestation request, typically, the second request will be valid as well.

At this point, the device activation server 110 has the ability to verify the other data sent from the device 110. The process 700 uses (at 720) the certificate from the attestation authority to verify the signature and device identifier received from the device before forwarding the third set of cryptographic data to the data recovery servers. Specifically, the device activation server 110 uses the public key attested to by the certificate to verify the signature from the device (i.e., the signature of the cryptographic data and the device identifier, which was signed with the corresponding private key). The device activation server 110 also compares the device identifier in the certificate to the signed device identifier (and, in some embodiments, compares a separate device identifier in the certificate, such as an IMEI ID, with a stored identifier for the device).

The process determines (at 725) whether the device is verified, and if the device is not verified (i.e., the device fails any of the verification tests), the process ends. In some embodiments, the device activation server 110 sends an error message to the device 105, indicating that the device cannot be activated. Assuming, however, that the signature and device identifier are verified, the process sends (at 730) the first set of cryptographic data to the data recovery servers along with the now-verified device identifier. This operation is shown in FIG. 1 by the encircled 10.

The data recovery servers 120 receives the third set of cryptographic data, which is used to verify the device passcode. Assuming that the passcode is correctly verified by the data recovery servers 120, the servers provide the device access to the backed-up user data. In some embodiments, the data recovery servers 120 only store a device-specific recovery key, which is provided to the device 105 via the secure channel set up with the PAKE. The device can then use this recovery key to access the backed-up user data, possibly via one or more layers of indirection. In some embodiments, the data recovery servers 120 store a device-specific recovery key that was previously escrowed by the device (e.g., prior to the device being lost/stolen, or otherwise having its data deleted). In some embodiments, the device 105 can use this data recovery key to access a master recovery key, which in turn provides access to the backed-up user data stored on a separate set of servers.

The process 700 therefore receives (at 735) the encrypted data recovery key from the device recovery servers. The device activation server 110 cannot access this data recovery key, as it is encrypted to the shared key that forms the secure channel between the device 105 and the data recovery servers 120. This operation is shown in FIG. 5 via the encircled 11.

Lastly, the process 700 sends (at 740) unlock instructions (its own response) to the device along with the encrypted data recovery key from the data recovery servers. FIG. 5 illustrates this response with the encircled 12. This enables the device to complete activation and be re-registered with the same account (e.g., cloud services account) as before. In addition, the device can encrypt the data recovery key and use this key to access the backed-up user data (e.g., application username and passwords, preferences, etc.).

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
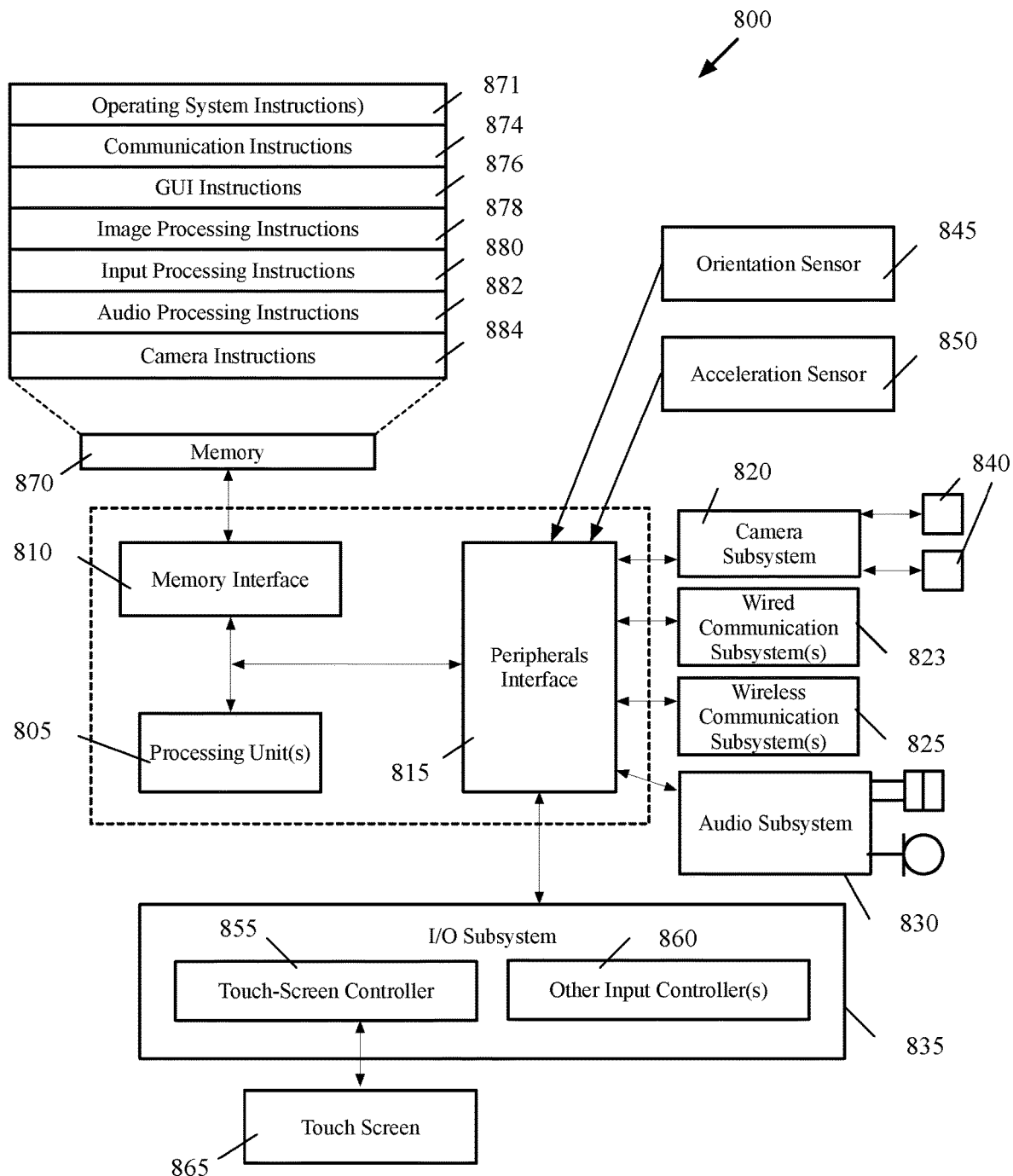
FIG. 8 illustrates an example of an architecture of a mobile computing device with which some embodiments are implemented.

The third-party applications and encryption processes of some embodiments operate on mobile devices, such as smart phones (e.g., iPhones®) and tablets (e.g., iPads®). FIG. 8 is an example of an architecture 800 of such a mobile computing device. As shown, the mobile computing device 800 includes one or more processing units 805 (e.g., a central processing unit CPU or set of CPU cores, a secure enclave processing unit, a graphics processing unit, etc.), a memory interface 810 and a peripherals interface 815.

The peripherals interface 815 is coupled to various sensors and subsystems, including a camera subsystem 820, a wired communication subsystem(s) 823, a wireless communication subsystem(s) 825, an audio subsystem 830, an I/O subsystem 835, etc. The peripherals interface 815 enables communication between the processing units 805 and various peripherals. For example, an orientation sensor 845 (e.g., a gyroscope) and an acceleration sensor 850 (e.g., an accelerometer) is coupled to the peripherals interface 815 to facilitate orientation and acceleration functions.

The camera subsystem 820 is coupled to one or more optical sensors 840 (e.g., a charged coupled device (CCD) optical sensor, a complementary metal-oxide-semiconductor (CMOS) optical sensor, etc.). The camera subsystem 820 coupled with the optical sensors 840 facilitates camera functions, such as image and/or video data capturing. The wired communication subsystem 823 and wireless communication subsystem 825 serve to facilitate communication functions.

In some embodiments, the wireless communication subsystem 825 includes radio frequency receivers and transmitters, and optical receivers and transmitters (not shown in FIG. 8). These receivers and transmitters of some embodiments are implemented to operate over one or more communication networks such as a GSM network, a Wi-Fi network, a Bluetooth network, etc. The audio subsystem 830 is coupled to a speaker to output audio (e.g., to output voice navigation instructions). Additionally, the audio subsystem 830 is coupled to a microphone to facilitate voice-enabled functions in some embodiments.

The I/O subsystem 835 involves the transfer between input/output peripheral devices, such as a display, a touch screen, etc., and the data bus of the processing units 805 through the peripherals interface 815. The I/O subsystem 835 includes a touch-screen controller 855 and other input controllers 860 to facilitate the transfer between input/output peripheral devices and the data bus of the processing units 805. As shown, the touch-screen controller 855 is coupled to a touch screen 865. The touch-screen controller 855 detects contact and movement on the touch screen 865 using any of multiple touch sensitivity technologies. The other input controllers 860 are coupled to other input/control devices, such as one or more buttons. Some embodiments include a near-touch sensitive screen and a corresponding controller that can detect near-touch interactions instead of or in addition to touch interactions.

The memory interface 810 is coupled to memory 870. In some embodiments, the memory 870 includes volatile memory (e.g., high-speed random access memory), non-volatile memory (e.g., flash memory), a combination of volatile and non-volatile memory, and/or any other type of memory. As illustrated in FIG. 8, the memory 870 stores an operating system (OS) 871. The OS 871 includes instructions for handling basic system services and for performing hardware dependent tasks.

The memory 870 also includes communication instructions 874 to facilitate communicating with one or more additional devices (e.g., for peer-to-peer data sharing, or to connect to a server through the Internet for cloud-based data sharing); graphical user interface instructions 876 to facilitate graphic user interface processing; image processing instructions 878 to facilitate image-related processing and functions; input processing instructions 880 to facilitate input-related (e.g., touch input) processes and functions; audio processing instructions 882 to facilitate audio-related processes and functions; and camera instructions 884 to facilitate camera-related processes and functions. The instructions described above are merely exemplary and the memory 870 includes additional and/or other instructions in some embodiments. For instance, the memory for a smart-phone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 8 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 8 may be split into two or more integrated circuits.

Figure 9:
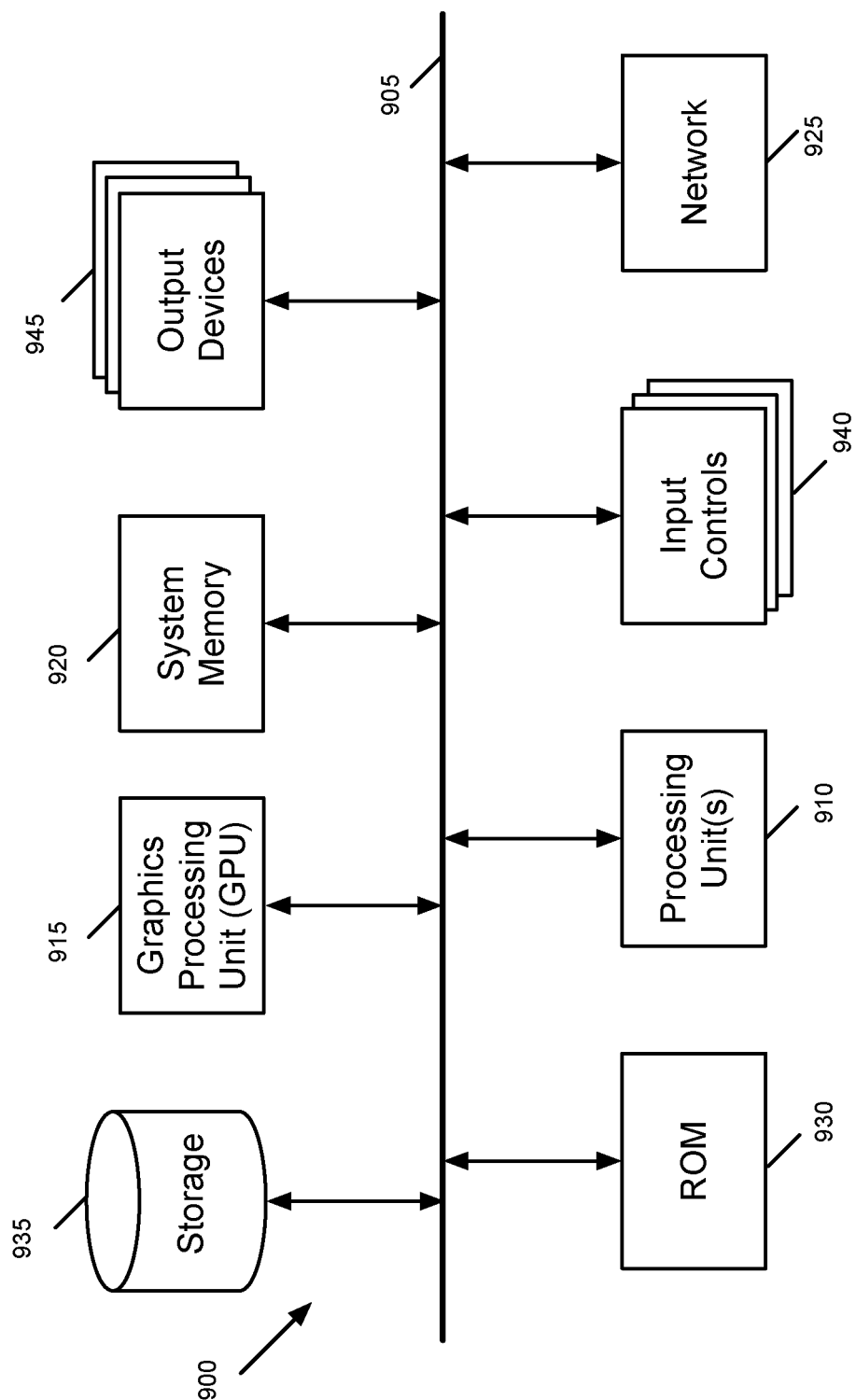
FIG. 9 conceptually illustrates another example of an electronic system with which some embodiments of the invention are implemented.

FIG. 9 conceptually illustrates another example of an electronic system 900 with which some embodiments of the invention are implemented. The electronic system 900 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 900 includes a bus 905, processing unit(s) 910, a graphics processing unit (GPU) 915, a system memory 920, a network 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the GPU 915, the system memory 920, and the permanent storage device 935.

From these various memory units, the processing unit(s) 910 retrieves instructions to execute and data to process in order to execute the processes of the invention. The processing unit(s) may be a single processor or a multi-core processor in different embodiments. Some instructions are passed to and executed by the GPU 915. The GPU 915 can offload various computations or complement the image processing provided by the processing unit(s) 910. In some embodiments, such functionality can be provided using CoreImage's kernel shading language.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive, integrated flash memory) as the permanent storage device 935.

Other embodiments use a removable storage device (such as a floppy disk, flash memory device, etc., and its corresponding drive) as the permanent storage device. Like the permanent storage device 935, the system memory 920 is a read-and-write memory device. However, unlike storage device 935, the system memory 920 is a volatile read-and-write memory, such a random access memory. The system memory 920 stores some of the instructions and data that the processor needs at runtime. In some embodiments, the invention's processes are stored in the system memory 920, the permanent storage device 935, and/or the read-only memory 930. For example, the various memory units include instructions for processing multimedia clips in accordance with some embodiments. From these various memory units, the processing unit(s) 910 retrieves instructions to execute and data to process in order to execute the processes of some embodiments.

The bus 905 also connects to the input and output devices 940 and 945. The input devices 940 enable the user to communicate information and select commands to the electronic system. The input devices 940 include alphanumeric keyboards and pointing devices (also called "cursor control devices"), cameras (e.g., webcams), microphones or similar devices for receiving voice commands, etc. The output devices 945 display images generated by the electronic system or otherwise output data. The output devices 945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 9, bus 905 also couples electronic system 900 to a network 925 through a network adapter (not shown). In this manner, the computer can be a part of a network of computers (such as a local area network ("LAN"), a wide area network ("WAN"), or an Intranet), or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures (including FIGS. 2, 3, 6, and 7) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for recovering user data for a device, the method comprising:
   to initiate recovery of the user data, sending to a first server a first request comprising at least (i) a device identifier and (ii) a first set of cryptographic data for a second set of servers with which the first server communicates;
   if the first server verifies the device identifier with an attestation authority, receiving, from the first server, a second set of cryptographic data generated by the second set of servers;
   after receiving input of a device passcode previously used for the device, the device passcode being different than a most recently used device passcode, sending to the first server a second request comprising at least a third set of cryptographic data for the second set of servers generated based on the input device passcode; and
   if the first server verifies the device passcode with the second set of servers, receiving access to the user data.

2. The method of claim 1, wherein the first server is a device activation server and the second set of servers is a set of data recovery servers, wherein prior to verification by the first server and recovery of the user data, the device only has a communication channel to the device activation server and not to the attestation authority or the set of data recovery servers.

3. The method of claim 1, wherein the first server, attestation authority, and second set of servers are all operated by a same entity.

4. The method of claim 1 further comprising, before sending the first request, generating the first set of cryptographic data.

5. The method of claim 1, wherein the first request comprises an attestation request for the attestation authority, the attestation request comprising the device identifier, a public key of a one-time key pair generated by the device, and an attestation using a device-specific key known to the attestation authority.

6. The method of claim 5, wherein the first request further comprises a signature of the device identifier and first set of cryptographic data, the signature generated using a private key of the one-time key pair.

7. The method of claim 6, wherein:
   the first server sends the attestation request to the attestation authority;
   the attestation authority verifies the request based on the device-specific key matching the device identifier in the attestation request and returns a certificate attesting to a one-time public key of the one-time key pair, with the device identifier, to the first server; and
   the first server verifies that the device identifier in the certificate matches the device identifier signed by a one-time private key of the one-time key pair.

8. A non-transitory machine readable medium storing a program which when executed by at least one processing unit recovers user data for a device, the program comprising sets of instructions for:
   to initiate recovery of the user data, sending to a first server a first request comprising at least (i) a device identifier and (ii) a first set of cryptographic data for a second set of servers with which the first server communicates, the first set of cryptographic data comprising a signature generated by a hardware-specific private key stored on the device;
   if the first server verifies the signature with an attestation authority, receiving, from the first server, a second set of cryptographic data generated by the second set of servers;
   after receiving input of a device passcode previously used for the device, sending to the first server a second request comprising at least a third set of cryptographic data for the second set of servers generated based on the input device passcode; and
   if the first server verifies the device passcode with the second set of servers, receiving access to the user data.

9. The non-transitory machine readable medium of claim 8, wherein the first set of cryptographic data comprises a first nonce generated by the device and the second set of cryptographic data comprises a second nonce generated by the second set of servers.

10. The non-transitory machine readable medium of claim 9, wherein the program further comprises sets of instructions for:
    receiving the input of the device passcode; and
    generating the third set of cryptographic data by performing a mathematical operation using the input passcode to generate an output and combining the output with the second nonce.

11. The non-transitory machine readable medium of claim 10, wherein the first server provides the third set of cryptographic data to the second set of servers, wherein the second set of servers verifies the device passcode and provides a data recovery key for use by the device to access the user data.

12. The non-transitory machine readable medium of claim 11, wherein the set of instructions for receiving access to the user data comprises a set of instructions for receiving the data recovery key from the first server.

13. The non-transitory machine readable medium of claim 11, wherein the data recovery key is protected by a key based on at least the first and second sets of cryptographic data.

14. The non-transitory machine readable medium of claim 8 further comprising a set of instructions for sending a third request to the first server instead of the second request if the device receives input of a cloud services account name and password instead of a device passcode, wherein the third request does not include the third set of cryptographic data and does not require verification by the attestation authority.

15. The non-transitory machine readable medium of claim 8, wherein the hardware-specific private key comprises a device-specific private key installed on the device by a manufacturer of the device.

16. An electronic device comprising:
    a set of processing units; and
    a non-transitory machine readable medium storing a program which when executed by at least one processing unit recovers user data for the electronic device, the program comprising sets of instructions for:
- to initiate recovery of the user data, sending to a first server a first request comprising at least (i) a device identifier and (ii) a first set of cryptographic data for a second set of servers with which the first server communicates;
- if the first server verifies the device identifier with an attestation authority, receiving, from the first server, a second set of cryptographic data generated by the second set of servers;
- in response to receiving, from the first server, the second set of cryptographic data, receiving input of a device passcode previously used for the electronic device;
- sending to the first server a second request comprising at least a third set of cryptographic data for the second set of servers generated based on the input device passcode; and
- if the first server verifies the device passcode with the second set of servers, receiving access to the user data.

17. The electronic device of claim 16, wherein the second request further comprises the device identifier, wherein the electronic device only receives access to the data if the device identifier is verified a second time with the attestation authority.

18. The electronic device of claim 17, wherein the second request comprises an attestation request for the attestation authority, the attestation request comprising the device identifier, a public key of a one-time key pair generated by the device, and an attestation using a device-specific key known to the attestation authority.

19. The electronic device of claim 18, wherein the second request further comprises a signature of the device identifier and third set of cryptographic data, the signature generated using a private key of the one-time key pair.

20. The electronic device of claim 19, wherein:
- the first server sends the attestation request to the attestation authority;
- the attestation authority verifies the request based on the device-specific key matching the device identifier in the attestation request and returns a certificate attesting to the one-time public key, with the device identifier, to the first server; and the first server verifies that the device identifier in the certificate matches the device identifier signed by the one-time private key.

21. The electronic device of claim 16, wherein the device passcode is a most recently used device passcode for the electronic device.

* * * * *